UNITED STATES PATENT OFFICE.

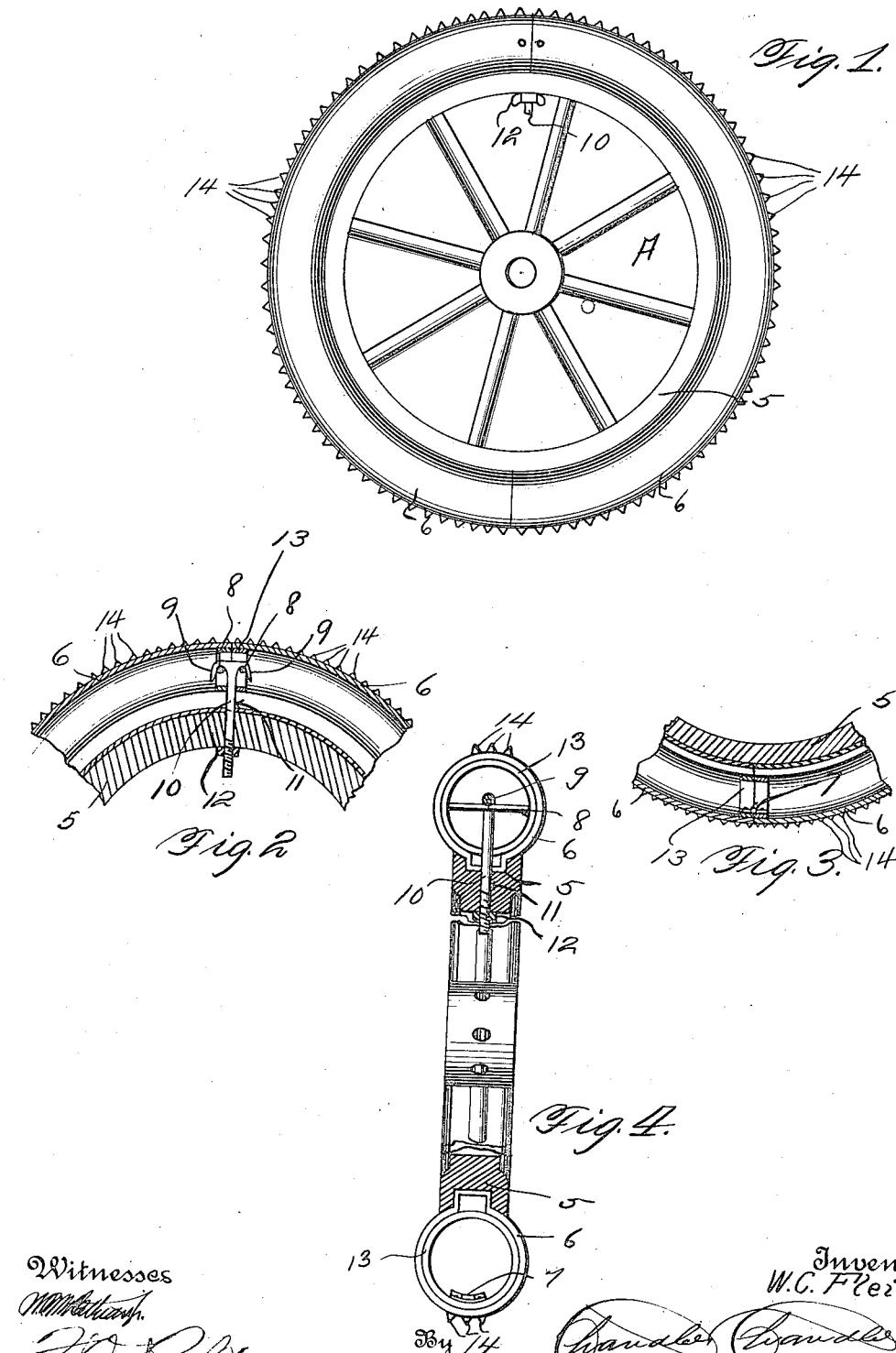

WILLIAM C. FLEISHER, OF HACKENSACK, MINNESOTA.

AUTOMOBILE-TIRE.

1,306,055.  Specification of Letters Patent.  Patented June 10, 1919.

Application filed August 23, 1918. Serial No. 251,150.

*To all whom it may concern:*

Be it known that I, WILLIAM C. FLEISHER, a citizen of the United States, residing at Hackensack, in the county of Cass, State of Minnesota, have invented certain new and useful Improvements in Automobile-Tires; and I do hereby declare the following to be a full, clear, and exact description of the invention, such as will enable others skilled in the art to which it appertains to make and use the same.

The invention relates to a tire, and more particularly to the class of metallic automobile tires.

The primary object of the invention is the provision of a tire of this character wherein the same can be readily applied to and removed from the felly or rim of the wheel and will possess the required resiliency to absorb shocks and jars, yet the same cannot be punctured or injured by nails, glass or other damaging substances within a road bed in the path of the tire when in use.

Another object of the invention is the provision of a tire of this character wherein the use of air is entirely dispensed with and the same will withstand wear and hard usage, the tread or surface of the tire being calked to avoid slipping of the wheel upon slippery surfaces.

A further object of the invention is the provision of a tire of this character which is extremely simple in construction, comparatively light in weight, yet strong, durable, and inexpensive to manufacture.

With these and other objects in view the invention consists in the features of construction, combination and arrangement of parts as will be hereinafter fully described, illustrated in the accompanying drawing, and pointed out in the claims hereunto appended.

In the accompanying drawing:—

Figure 1 is a side elevation of a wheel showing the tire constructed in accordance with the invention applied;

Fig. 2 is a fragmentary vertical sectional view thereof;

Fig. 3 is a similar view of another portion;

Fig. 4 is a vertical transverse sectional view.

Similar reference characters indicate corresponding parts throughout the several views in the drawing.

Referring to the drawing in detail, A designates generally a vehicle wheel of the automobile type having the felly 5 upon which is concentrically mounted the tire hereinafter fully described.

The tire comprises complementary semi-circular tubular sections 6, each formed from metal having the required resiliency and at one pair of adjacent meeting edges of said sections is arranged a leaf hinge 7 for swingingly connecting the said sections together, the hinge being fastened at its leaf portions to the inner faces of the section 6 at the tread sides thereof.

In the other pair of meeting ends of the section 6 are transverse keeper pins 8 with which are adapted to detachably engage the double bills 9 of a securing or fastening bolt 10 which is passed radially through a suitable hole 11 formed in the felly or rim 5 and has threaded thereon an adjustable locking nut 12 so that in this manner the bolt 10 can be secured in the felly or rim 5 and the section 6 firmly and securely clamped concentrically upon the rim or felly of the wheel.

Mounted in the meeting ends of the sections 6 of the tire are collar-like reinforcements 13 which are welded or otherwise made fast in said ends to reinforce the same.

The tread portion of the section 6 of the tire is provided with calks 14 forming an anti-skid tread.

It will be apparent that the tire can be readily mounted upon and removed from the felly or rim 5 of the wheel A and that said tire when upon the wheel will possess the required resiliency and be practically puncture proof, as it will resist damage by nails or other substances liable to be run across in the path of the travel of the tire when in use, thereby assuring longevity to the same.

What is claimed is:—

1. The combination with a wheel felly, of a tire comprising semi-circular tubular sections concentrically of the felly and swingingly connected together, transverse anchor pins within the sections near the detached ends, and a double bill securing member engaged with the pins and in the felly.

2. The combination with a wheel felly, of a tire comprising semi-circular tubular sections concentrically of the felly and swingingly connected together, transverse anchor pins within the sections near the detached ends, a double bill securing member engaged with the pins and in the felly, a lock nut detachably and adjustably mounted on the securing means to fasten the same in the felly, and reinforcements at the meeting ends of the tubular sections.

In testimony whereof, I affix my signature, in the presence of two witnesses.

WILLIAM C. FLEISHER.

Witnesses:
A. O. MILLER,
J. MORGAN.